United States Patent
McKellar et al.

(10) Patent No.: US 8,103,953 B2
(45) Date of Patent: *Jan. 24, 2012

(54) DOCUMENT STRUCTURES FOR DELTA HANDLING IN SERVER PAGES

(75) Inventors: Brian McKellar, Heidelberg (DE); Bjorn Goerke, Muhlhausen (DE)

(73) Assignee: SAP AG, Walldorf (DE)

( * ) Notice: Subject to any disclaimer, the term of this patent is extended or adjusted under 35 U.S.C. 154(b) by 924 days.

This patent is subject to a terminal disclaimer.

(21) Appl. No.: 12/103,602

(22) Filed: Apr. 15, 2008

(65) Prior Publication Data

US 2008/0195933 A1    Aug. 14, 2008

Related U.S. Application Data

(63) Continuation of application No. 10/159,819, filed on May 31, 2002, now Pat. No. 7,434,163.

(51) Int. Cl.
*G06F 17/00* (2006.01)
(52) U.S. Cl. ......... 715/234; 715/760; 709/203; 709/219
(58) Field of Classification Search .................. 715/234, 715/229, 237; 707/1; 709/209, 214
See application file for complete search history.

(56) References Cited

U.S. PATENT DOCUMENTS

| | | | |
|---|---|---|---|
| 5,701,451 A | 12/1997 | Rogers et al. | |
| 5,706,507 A | 1/1998 | Schloss | |
| 5,835,712 A | 11/1998 | DuFresne | |
| 5,946,697 A | 8/1999 | Shen | |
| 5,963,952 A | 10/1999 | Smith | |
| 5,983,227 A * | 11/1999 | Nazem et al. | 1/1 |
| 6,003,087 A | 12/1999 | Housel et al. | |
| 6,006,260 A | 12/1999 | Barrick et al. | |
| 6,031,989 A | 2/2000 | Cordell | |
| 6,073,173 A | 6/2000 | Bittinger et al. | |
| 6,112,242 A | 8/2000 | Jois et al. | |
| 6,122,657 A | 9/2000 | Hoffmann et al. | |
| 6,128,655 A | 10/2000 | Fields et al. | |
| 6,161,107 A | 12/2000 | Stern | |
| 6,167,395 A | 12/2000 | Beck et al. | |

(Continued)

FOREIGN PATENT DOCUMENTS

EP        1016987 A2    7/2000

OTHER PUBLICATIONS

Bai, Jing et al., "Design and Development of an Interactive Medical Teleconsultation System Over the World Wide Web", *IEEE Transactions on Information Technology in Biomedicine*, vol. 2, No. 2 (Jun. 1998), pp. 74-79.

(Continued)

*Primary Examiner* — Cesar Paula
*Assistant Examiner* — Quoc A Tran
(74) *Attorney, Agent, or Firm* — Fish & Richardson P.C.

(57) ABSTRACT

Methods, systems and apparatus, including computer program products, for delta handling in server pages. A server method, for processing a page document that has multiple page components, includes generating, for each page component of the page document, a corresponding browser component. The method also includes building a document structure of a browser document corresponding to the page document. The document structure includes a page buffer and the generated browser components. The page buffer and the browser components have relationships that reflect the structure of the browser document. The method can identify a browser delta in the document structure and send the browser delta to an output stream.

11 Claims, 12 Drawing Sheets

U.S. PATENT DOCUMENTS

| | | | |
|---|---|---|---|
| 6,209,029 B1 | 3/2001 | Epstein et al. | |
| 6,239,797 B1 | 5/2001 | Hills et al. | |
| 6,249,291 B1 | 6/2001 | Popp et al. | |
| 6,253,228 B1 | 6/2001 | Ferris et al. | |
| 6,266,681 B1 | 7/2001 | Guthrie | |
| 6,311,187 B1 | 10/2001 | Jeyaraman | |
| 6,377,957 B1 | 4/2002 | Jeyaraman | |
| 6,389,592 B1 | 5/2002 | Ayres et al. | |
| 6,397,387 B1 | 5/2002 | Rosin et al. | |
| 6,429,880 B2 | 8/2002 | Marcos et al. | |
| 6,480,865 B1 | 11/2002 | Lee et al. | |
| 6,605,120 B1 | 8/2003 | Fields et al. | |
| 6,622,168 B1 | 9/2003 | Datta | |
| 6,694,336 B1 | 2/2004 | Multer et al. | |
| 6,766,351 B1 | 7/2004 | Datla | |
| 6,807,606 B2 | 10/2004 | Copeland et al. | |
| 7,007,237 B1 | 2/2006 | Sharpe | |
| 7,051,084 B1* | 5/2006 | Hayton et al. | 709/219 |
| 7,139,976 B2 | 11/2006 | Kausik et al. | |
| 2002/0004813 A1 | 1/2002 | Agrawal et al. | |
| 2002/0046240 A1 | 4/2002 | Graham et al. | |
| 2002/0091736 A1 | 7/2002 | Wall | |
| 2002/0107892 A1* | 8/2002 | Chittu et al. | 707/514 |
| 2002/0147849 A1 | 10/2002 | Wong | |
| 2002/0156812 A1 | 10/2002 | Krasnoiarov et al. | |
| 2002/0156815 A1 | 10/2002 | Davia | |
| 2002/0188696 A1 | 12/2002 | Ullmann et al. | |
| 2003/0018612 A1 | 1/2003 | Melbin | |
| 2003/0125966 A1 | 7/2003 | Viswanath et al. | |
| 2003/0149749 A1* | 8/2003 | Carlucci et al. | 709/219 |
| 2003/0188016 A1 | 10/2003 | Agarwalla et al. | |
| 2003/0212987 A1 | 11/2003 | Demuth | |
| 2003/0217331 A1 | 11/2003 | McKellar et al. | |
| 2003/0225826 A1 | 12/2003 | McKellar et al. | |
| 2003/0226106 A1 | 12/2003 | McKellar et al. | |
| 2004/0205558 A1 | 10/2004 | Holloway et al. | |
| 2005/0099963 A1 | 5/2005 | Multer et al. | |

OTHER PUBLICATIONS

Chang, George et al.; "A Graphical Environment for Change Detection in Structured Documents"; *IEEE Computer Soc.*; Aug. 13, 1997; pp. 536-541.

Dickens, Phillip M. et al., "An Evaluation of Java's I/O Capabilities for High-Performance Computing", *Proceedings of the ACM 2000 Conference on Java Grande*, San Francisco, CA (2000), pp. 26-35.

Douglis, Fred et al.; HPP: HTML Macro-Preprocessing to Support Dynamic Document Caching; *Proceedings of the Usenix Symposium on Internet Technologies and Systems*; Dec. 8, 1997; pp. 83-94.

Edwards, Peter; "DIY Intranets With CFML/XML/HTML/CGI/ASP/JSP"; *Vine*; No. 119; 2000; pp. 53-60.

Feinstein, Wei Pan, et al., "A Study of Technologies for Client/Server Applications," Proceedings of the 38th Annual ACM Southeast Regional Conference, Apr. 2000, Hong Kong, pp. 184-193.

Floyd, Rick et al.; "Mobile Web Access Using eNetwork Web Express"; *IEEE Personal Communications*; vol. 5, No. 5; Oct. 1, 1998; pp. 47-52.

Hall, Marty, et al., Core Web Programming, $2^{nd}$ Edition, Sun Microsystems Press (Prentice Hall), Palo Alto, CA, © 2001, pp. 792-793, 965-968, 971-977 and 1015-1026.

Hougland, Damon, et al., Core JSP, Prentice Hall PTR, Upper Saddle River, NJ, © 2001, pp. 1-11, 54-56, 60-61, 78-87 and 131-143.

Housel, Barron C., et al., "WEBExpress: A Client/Intercept Based System for Optimizing Web Browsing in a Wireless Environment," Mobile Networks and Applications, vol. 3, Issue 4, Baltzer Science Publishers BV, © 1998, pp. 419-431.

Housel, C., et al.; "WebExpress: A System for Optimizing Web Browsing in a Wireless Environment"; *Proceedings of the Annual International Conference on Mobile Computing and Networking*; Nov. 11, 1996; pp. 108-116.

Kemper, Alfons et al., "Hyperqueries: Dynamic Distributed Query Processing on the Internet", *Proceedings of the $27^{th}$ VLDB Conference*, Roma, Italy, Sep. 11-14, 2001, pp. 1-10.

Kristmundsson, Thor, et al., "Strut Your Stuff With JSP Tags: Use and Extend the Open Source Struts JSP Tag Library", developers.sun.com, Aug. 2001, pp. 1-7 (downloaded from: http://www.sun.com/developer/technicalArticles/javaserverpages/strust_jsp/).

Mahmoud, Qusay H., "Web Application Development with JSP and XML, Part I: Fast Track JSP", TheServerSide.COM, May 2001, pp. 1-10 (downloaded from: http://www.theserverside.com/articles/article.tss?I=JSP-XML).

Mahmoud, Qusay H., "Web Application Development with JSP and XML. Part III: Developing Custom JSP Tags", TheServerSide.COM, Aug. 2001, pp. 1-22 (downloaded from: http://www.theserverside.com/articles/article.tss?I=JSPXML3).

McPherson, Scott, "Java server Pages: A developer's Perspective", developers.sun.com, Aug. 2001, pp. 1-5 (downloaded from: http://www.sun.com/developer/technicalArticles/Programming/jsp/index.html).

Microsoft Dictionary, $5^{th}$ Edition, Microsoft Press, Redmond, WA, © 2002, pp. 293-294.

Mogul, Jeffrey C., "Squeezing More Bits Out of HTTP Caches", *IEEE Network*, vol. 14, Iss. 3 (May/Jun. 2000), pp. 6-14.

Seshadri, Govind, "Advanced Form Processing Using JSP", JavaWorld, Mar. 2000, pp. 1-20, (downloaded from: http://www.javaworld.com/javaworld/jw-03-2000/jw-0331-ssj-fors_p.html).

Weissinger, A. Keyton, ASP in a Nutshell, $2^{nd}$ Edition, O'Reilly & Associates, Sebastopol, CA Jul. 2000, pp. 3-22.

Williams, "HTTP: Delta-Encoding Notes"; Published Jan. 17, 1997; Computer Science Department, Virginia Polytechnic and State University Blacksburg, 10 pages URL: http://ei.cs.vt.edu/~williams/DIFF/prelim.html.

Williams, S.; "HTTP: Delta-Encoding Notes"; *Internet*; Jan. 17, 1997; 7pp.

Wills, Craig E. et al., "N for the Price of 1: Bundling Web Objects for More Efficient Content Delivery", WWW 10, (May 1-5, 2001), Hong Kong, pp. 257-264.

* cited by examiner

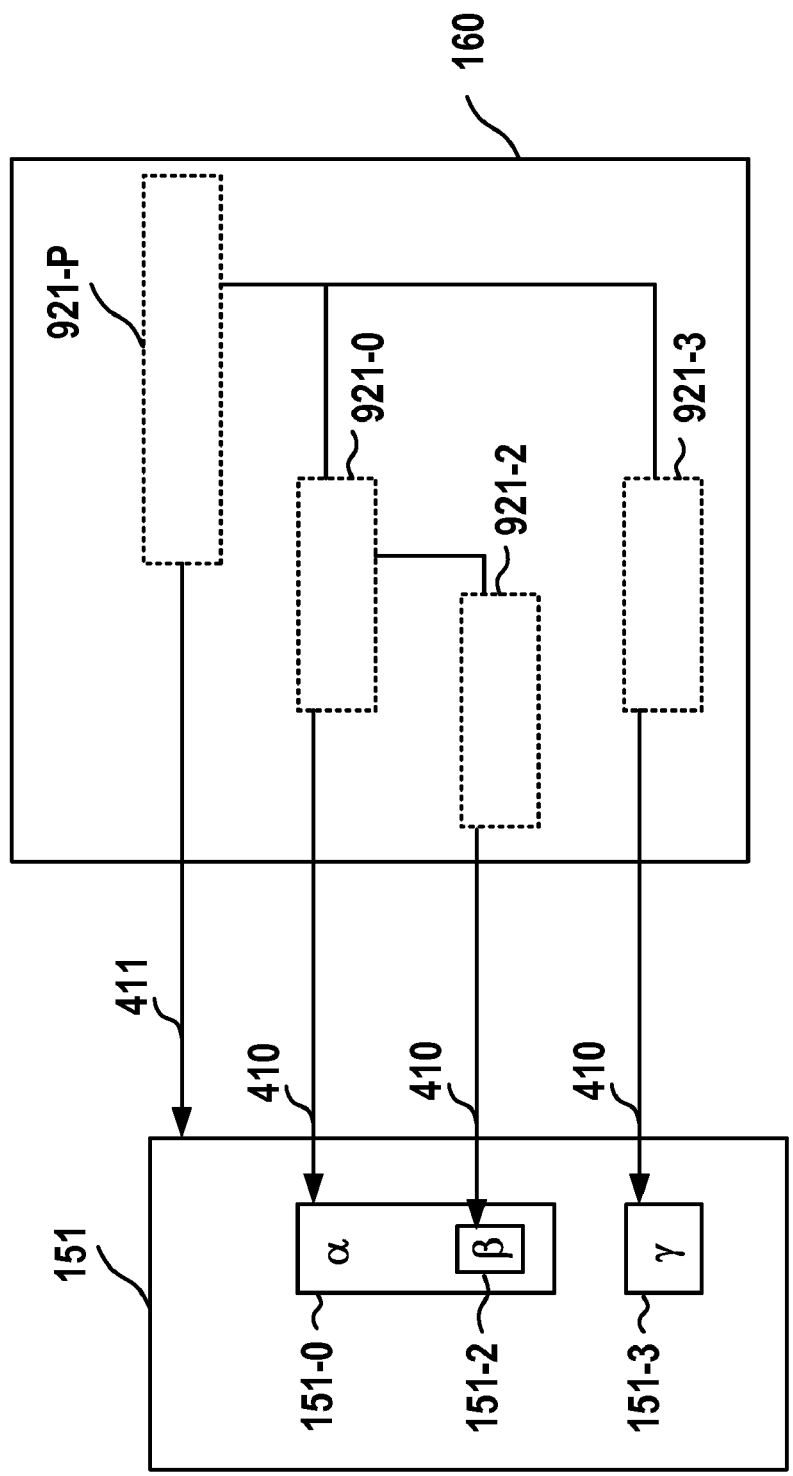

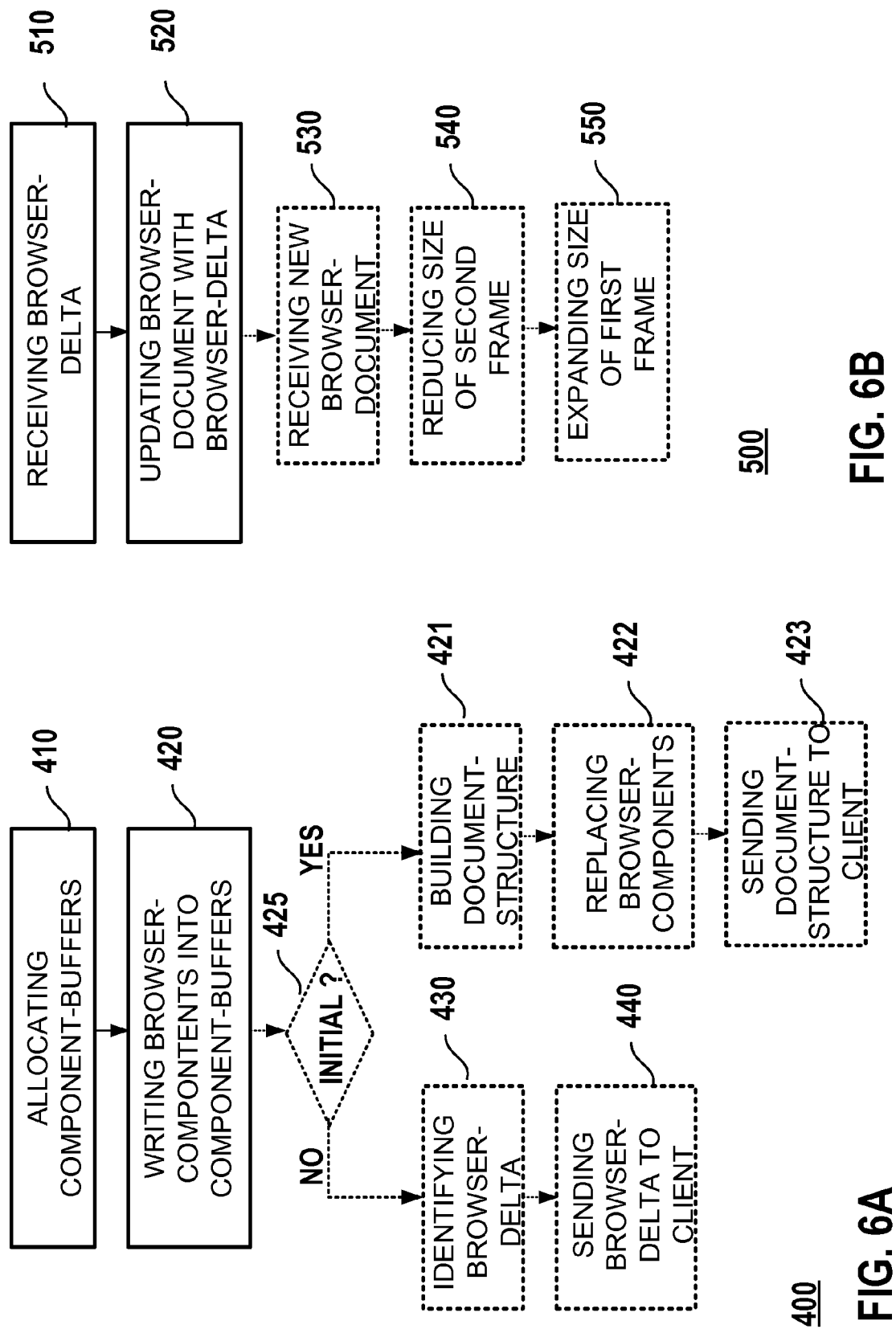

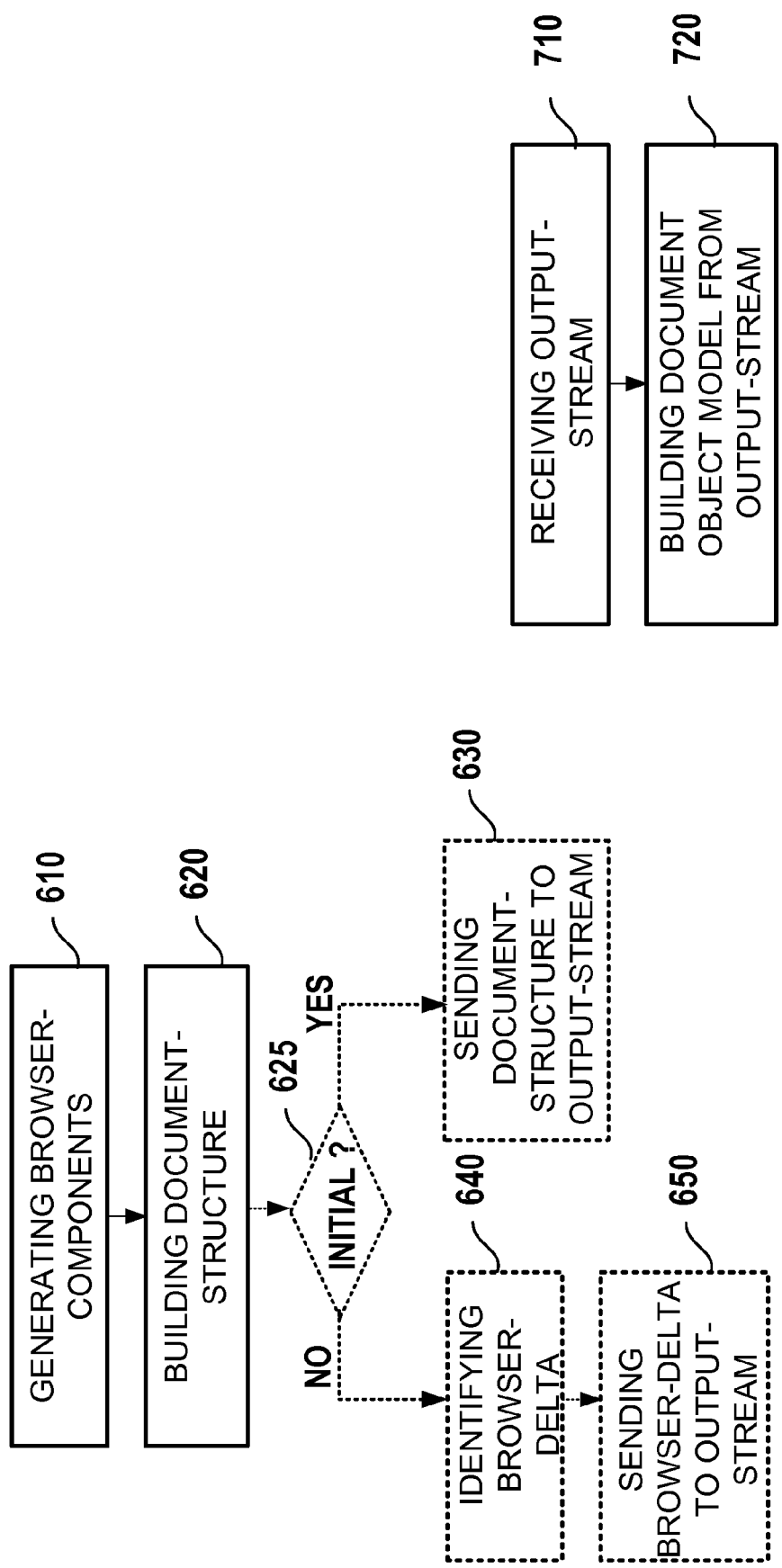

DOCUMENT STRUCTURES FOR DELTA HANDLING IN SERVER PAGES

CROSS-REFERENCE TO RELATED APPLICATIONS

This application claims benefit under 35 U.S.C. §120 of U.S. application Ser. No. 10/159,819, filed on May 31, 2002.

BACKGROUND OF THE INVENTION

The present invention relates to client-server communication.

A JavaServer Pages™ ("JSP")") page is a markup language page, typically an HTML (Hypertext Markup Language) web page, that contains additional bits of code that execute application logic to generate dynamic content. The application logic may involve various kinds of objects that can be accessed from a JSP page. For example, a JSP page may contain HTML code that displays static text and graphics, as well as a method call to an object that accesses a database; when the page is displayed in a user's browser, it will contain both the static HTML content and dynamic information retrieved from the database. Thus, a JSP page looks like an HTML (or XML) page—it contains text encapsulated by tags, which are defined between angle brackets ("< >"). While HTML tags are processed by a user's web browser to display the page, JSP tags are used by the web server to generate dynamic content.

A JSP page is an example of a dynamic web page, which in this specification will be referred to simply as a server page or a page. There are other technologies, similar to JSP, that can be used to create HTML or XML pages dynamically on a server. These include, by way of example, SAP Business Server Pages (BSP), Microsoft Active Server Pages (ASP), and AOLserver Dynamic Pages (ADP) technologies. In these technologies, functionality is embedded in structure in the form of special tags in a markup language document, and content and structure (presentation) are merged when the page is generated by a server. In alternative technologies for creating server pages, e.g., traditional servlet and CGI (Common Gateway Interface) script technologies, structure and presentation are embedded within functionality to create dynamic web pages.

In this specification, it is sometimes necessary to distinguish the page as it exists on the server from the page as it exists on the client. The term "page document" will be used to refer to the page that is processed by a server—e.g., a .jsp page. The term "browser document" will be used to refer to the page that is received and processed by a client and generally displayed to a human user—e.g., an HTML page generated by processing of a .jsp page by a JSP engine.

A server page can include information for a graphical user interface ("GUI") to generate a browser document. The server can transmit the browser document to a client through a network. At the client, the browser document is rendered for display. This is typically done by a web browser, such as the Microsoft® Internet Explorer. When a user interacts with the client through the GUI to refresh the page, the entire process is repeated: the whole page, including layout information and data, is generated on the server and the resulting browser document is transmitted from the server to the client through the network. If the network has insufficient bandwidth, transmitting the whole page can cause undesired effects: until the refreshed page is finally presented, there can be a long waiting time or screen flicker.

Some browsers, such as the Microsoft Internet Explorer 6.0, include a feature for flicker-free rendering. When the client receives a modified page, the browser identifies modified components of the page and only replaces these components instead of the whole page, for example, by dynamic HTML injection into the page's Document Object Model (DOM). Dynamic HTML injection can reduce screen flicker for the user, but, because the whole page is transmitted through the network, insufficient network bandwidth can still cause undesirable waiting times.

SUMMARY OF THE INVENTION

The present invention provides methods and apparatus, including computer program products, for defining and implementing a document structure for delta-handling of server pages.

In general, in one aspect, this invention provides methods and apparatus, including computer program products, for processing a page document on a server. The page document has multiple page components. For each page component of the page document, a corresponding browser component is generated. The server builds a document structure of a browser document corresponding to the page document. The document structure includes a page buffer and the generated browser components. The page buffer and the browser components have relationships that reflect the structure of the browser document.

Advantageous implementations of the invention can include one or more of the following features. The document structure can be sent to an output stream. The server can identify at least one browser delta in the document structure, and send the browser delta to an output stream. The page document can be a JSP, BSP, ADP, or ASP page. Each page component can be represented by a tag within the page document.

In general, in another aspect, this invention provides methods and apparatus, including computer program products, for using an output stream on a client. The client receives the output stream from a server. The output stream includes a document structure of a browser document corresponding to a page document on the server. The document structure includes a page buffer and multiple browser components. The page buffer and the browser components have relationships that reflect the structure of the browser document. From the output stream, the client builds a document object model of the browser document.

In general, in another aspect, this invention provides a data structure created as an output stream on a server for a client. The data structure includes a page buffer and multiple browser components. The page buffer is the root node of a document structure. The page buffer and the browser components have relationships that reflect the structure of a browser document represented by the data structure.

The invention can be implemented to realize one or more of the following advantages. The required bandwidth for network communication can be lower when compared to prior art systems where the whole browser document is exchanged between the server and client. When a minor portion of the browser document is modified, the browser delta transmission can require significantly less bandwidth than the whole browser document transmission. The browser delta can be determined by comparing two versions of the browser document. The differences between the two versions can be detected at the level of browser components. The granularity of the browser delta can be defined by the granularity of the corresponding browser component. The server can send the browser delta in an output stream to a client. An output stream data structure can provide any degree of granularity for the browser delta. The client can receive the browser delta in an invisible first frame and update the corresponding browser document in a second frame. The client can swap the roles of the first and the second frames. Consequently, a user who interacts with the client can experience a visually pleasing effect, because the update of the browser document with the browser delta results in a flicker free change of the graphical user interface. This effect can be achieved by building a document object model ("DOM") of the browser document by using an initial output stream and injecting into the DOM browser deltas that are received by the client through further future output streams.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 3A-3E are schematic diagrams illustrating generating an output stream on a server.

FIGS. 6A-6B are flow charts showing methods for delta handling in accordance with the invention.

FIGS. 7A-7B are flow charts showing methods for enabling delta handling in accordance with the invention.

Like reference symbols in the various drawings indicate like elements.

DETAILED DESCRIPTION

Definition of Terms

Client: A computer having a client relationship with a computer acting as a server.

Server: A computer having a server relationship with a computer acting as a client. A client and server are generally remote from each other and typically interact through a communication network, e.g., a local area network ("LAN") or a wide area network ("WAN"), e.g., the Internet. The relationship of client and server arises by virtue of computer programs running on the respective computers and having a client-server relationship to each other.

Application data: Data relating to a computer program application (e.g., customer number, address, phone number, and so forth).

Layout data: Data defining placement of content of a graphical user interface.

Browser delta: A data structure that represents what is different between two different states of a browser document (e.g., before and after a user interaction).

Tag: A representation of a page component in a page. For example, in JSP pages, tags use XML notation and represent a Java class.

Output stream: Data structure used to collect the output of page components.

Document Object Model: The Document Object Model is a platform- and language-neutral interface that allows programs and scripts dynamically to access and update the content, structure and style of documents, and that provides a mechanism to access and manipulate parsed HTML and XML content.

A Document Structure for Delta-Driven Refreshing of Pages

A system in accordance with the invention defines components of a server page. Each component can include content. Upon detecting that the content of one or more components have changed, the system identifies which of the other components have changed content as a result of the initial change. The system transmits the contents of components having changed content to a device, such as a client computer, that displays the contents.

To identify which of the other components have content that changed as a result of an initial change, the system defines and maintains a document structure that describes the relationship of the components, including describing the effect of an initial change in the content of a component on the contents of other components. The system identifies, based on the document structure, which of the components have changed content as a result of the initial change. Changes are also referred to as deltas.

EXAMPLES

Figure 1:
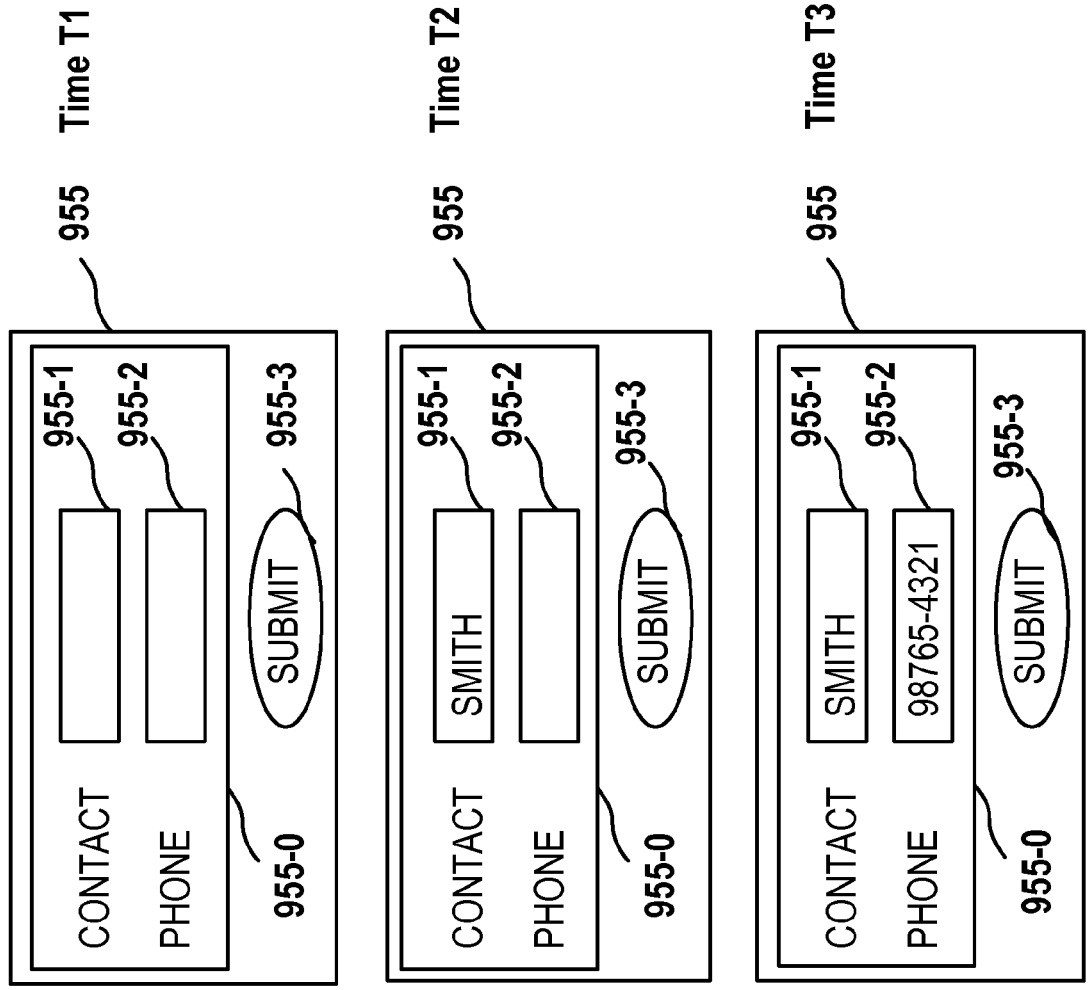
FIG. 1 is a schematic diagram illustrating an implementation of a graphical user interface in accordance with the present invention.

FIG. 1 illustrates an example implementation of a user's interaction with a graphical user interface 955 at three consecutive times T1, T2, and T3. For convenience, this example is used throughout this specification. However, any other graphical user interface can be implemented in accordance with the present invention. A client computer can render the GUI 955 for display to a user on an output device, e.g., on a computer display, and the user can interact with the GUI 955 by using an input device, e.g., a keyboard or a pointing device.

The GUI 955 illustrated in FIG. 1 is a form that can be used to allow a user to retrieve a phone number of a contact person from an application database. The user is prompted with the following form components: a frame component 955-0, a contact component 955-1, a phone component 955-2, and a submit component 955-3. The frame component 955-0 visualizes a contextual relationship between the contact component 955-1 and the phone component 955-2. The contact component 955-1 is an input field where the user can enter the name of the contact person. The phone component 955-2 is an output field where the contact person's phone number can be presented to the user. Implemented as a button, the submit component 955-3 can be pressed by the user to send a request to an application to retrieve the contact person's phone number.

At time T1, the user is prompted with the form 955 having empty contact (955-1) and phone (955-2) components. Next, the user enters the name, e.g., SMITH, of the contact person into contact component 955-1, and, at a later time T2, uses submit component 955-3 to send a request to retrieve the contact person's phone number. At time T3, after the application retrieves the phone number of the contact person, e.g., 98765-4321, the phone number is displayed for the user in phone component 955-2.

Figure 2:
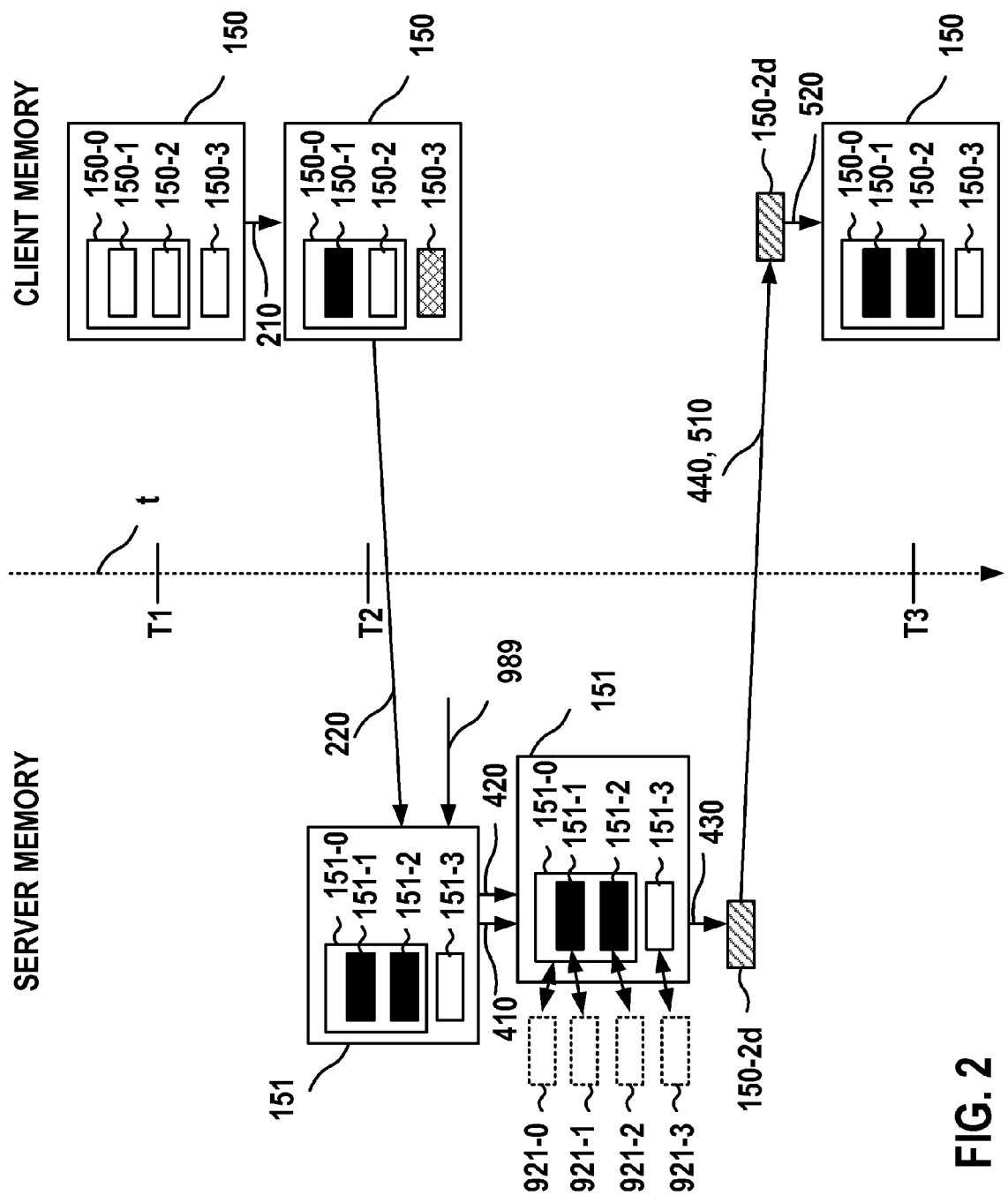
FIG. 2 is a schematic diagram illustrating interaction of a server and a client according to one implementation of the present invention.

FIG. 2 illustrates a client-server interaction. Represented by a vertical dashed arrow in FIG. 2, a time scale t indicates chronological order of events; time scale t, however, is not drawn to any scale. Times T1, T2, and T3 are reference points in the flow of events, and correspond to times shown in FIG. 1. Solid arrows represent specific events or signals. In FIG. 2, as divided by the time scale t, the left side represents objects that are stored in a memory of the server ("server memory"), and the right side represents objects that are stored in a memory of the client ("client memory"). In the example implementation, the server computer accesses application data such as contact person or phone number, and the client computer presents the application data to the user in GUI 955 (FIG. 1).

The server memory stores a page document 151. The page document 151 includes information to generate the form 955. For example, the page document 151 can be a page, such as a JSP, BSP, or ASP page. The page document 151 includes page components 151-0, 151-1, 151-2, 151-3 that correspond to form components 955-0, 955-1, 955-2, 955-3 (FIG. 1), respectively.

After translating the page document 151 into a browser document 150, typically done by the server, the browser document 150 is sent to the client. The browser document 150 can be a markup language document, for example, an HTML, XML, XHTML or WML document, which can be processed and rendered by a browser. The browser document 150 includes browser components 150-0, 150-1, 150-2, 150-3 that correspond to the page components 151-0, 151-1, 151-2, 151-3, respectively.

The client stores the browser document 150 in the client memory, and renders it at time T1 as form 955 on an output device. The browser document 150 can have dynamic data and static data. Dynamic data can be changed through user interaction. Examples of dynamic data include input fields, output fields, status indicators, and user defined layout elements. Static data are defined in an application and, in general, are not changed through user interaction. Examples of static data include application defined layout elements, headers, background colors, and background patterns. Examples for using dynamic and static data are given in FIGS. 3A-3C in one implementation of the present invention.

In the example implementation, as shown in FIG. 1 and FIG. 2, the user enters the name of the contact person (SMITH) into the contact component 955-1. Accordingly, the client fills (210) the corresponding browser component 150-1 with the name of the contact person (illustrated by dark fill color in FIG. 2). At time T2, the client submits (step 220) a request 989 for the contact person's phone number to the server. In one implementation, the user presses submit component 955-3 and the client stores a corresponding status for the browser component 150-3 (illustrated by a diagonal grid pattern in FIG. 2). Alternatively, the request 989 can be submitted automatically by an application or a computer.

The server receives the request 989. In one implementation, the server accesses an application, e.g., an address database, retrieves the requested phone number from the application, and updates the corresponding page component 151-2 in page document 151 with the retrieved phone number (illustrated by dark fill color in FIG. 2). The phone number "98765-4321" is an application delta. Other application deltas can be generated for other page components substantially simultaneously. The server represents the application delta, i.e., the retrieved phone number, as a browser component. As received by the server, the request 989 changes the content of page document 151 that is used for further processing.

The server allocates (step 410) component buffers 921-0, 921-1, 921-2, 921-3 (illustrated by dashed frames in FIG. 2) to page components 151-0 151-1, 151-2, 151-3, respectively. Into each component buffer 921-0, 921-1, 921-2, 921-3, the server writes (step 420) a corresponding browser component 150-0, 150-1, 150-2, 150-3. In FIG. 2, double arrows are drawn between component buffers and the corresponding page components to illustrate the allocation of component buffers to page components and the writing of browser components into component buffers.

The server writes (step 420) each browser component, i.e., 150-0, 150-1, 150-2, and 150-3, to its corresponding component buffer, i.e., 921-0, 921-1, 921-2, and 921-3. When the browser component of a component buffer changes, the server detects change and identifies the changed component buffer (step 430). The server detects the change by comparing current browser components to previous ones. In the example, a browser delta 150-2$d$ that represents the change is stored in component buffer 921-2. Depending on other requested data changes in request 989, the other component buffers can store other browser deltas. For convenience, however, in the example, only the component buffer 921-2 includes a browser delta. The allocation (410), writing (420), and identifying (430) steps are explained in more detail with reference to FIGS. 3A-3B.

The server sends (step 440) change information, which in the implementation being described is the browser delta 150-2$d$, to the client. After being received (step 510) by the client, the browser delta 150-2$d$ is stored in the client memory. With the browser delta 150-2$d$, the client updates (step 520) the corresponding browser component 150-2 (illustrated by dark fill color in FIG. 2) in the browser document 150. An implementation of the update is described with reference to FIG. 4. After updating the browser document 150, at time T3, the contact person's phone number (e.g. 98765-4321) is displayed for the user in phone component 955-2 corresponding to the browser component 150-2.

Figure 3B:
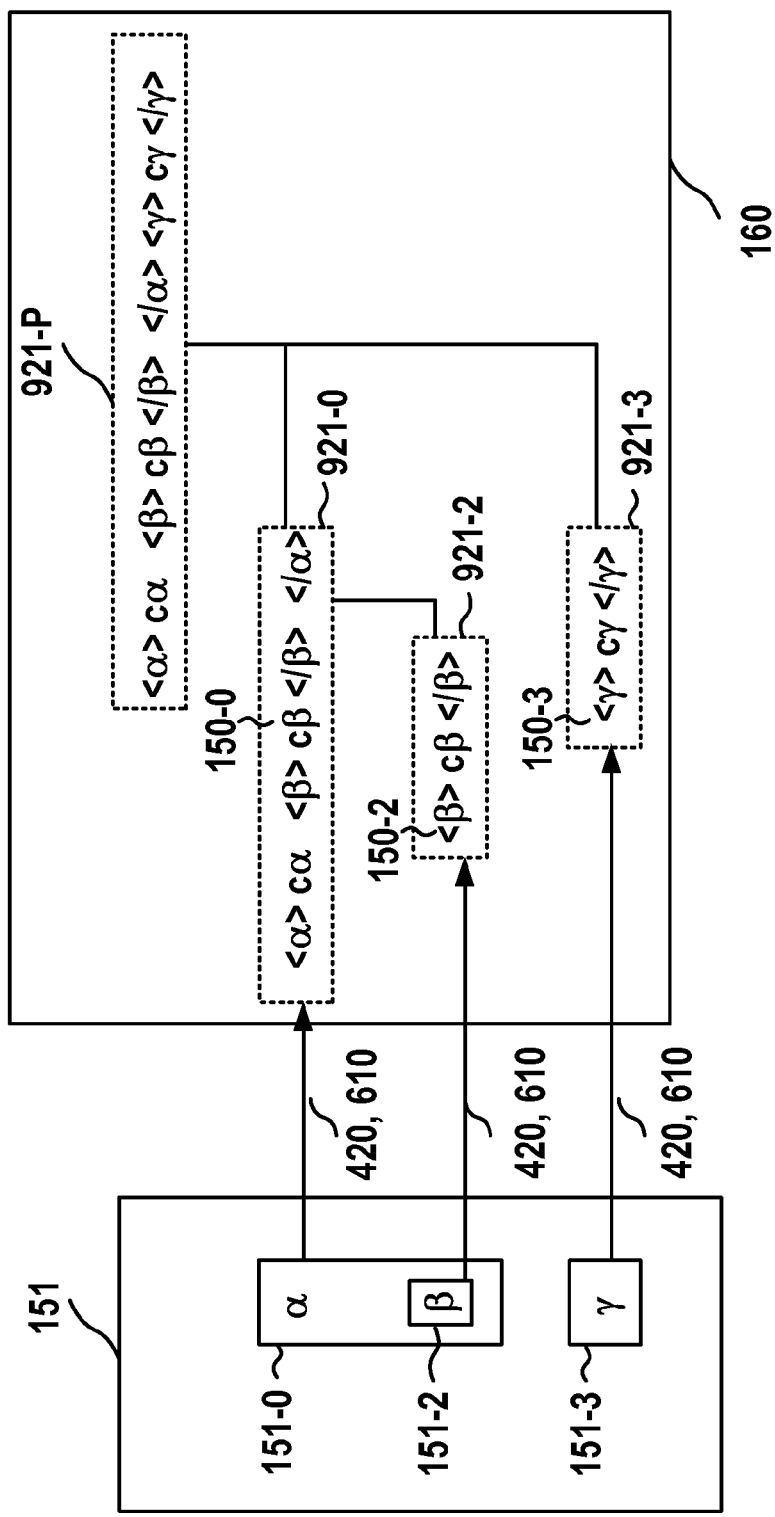

FIGS. 3A-3E illustrate details of generating an output stream 921-OS on the server. As shown in FIG. 3A, stored in the server memory, the page document 151 includes page components 151-0, 151-2, and 151-3, having identifiers (ID) α, β, and γ, respectively. Each identifier is a representation of the corresponding page component. When the server processes the page document 151, component buffers 921-0, 921-1, 921-2 are allocated (step 410) to corresponding page components 151-0, 151-2, 151-3, respectively. A component buffer is a portion of the server memory. A component buffer can be allocated by, for example, a JSP-writer or a BSP-writer, if the page document 151 is a JSP page or a BSP page, respectively.

In one implementation, a page buffer 921-P is allocated (step 411) to the page document 151. The server builds (step 620; FIG. 7) a document structure 160. In the document structure 160, component buffers are illustrated as child nodes and the page buffer 921-P is the root node. The document structure 160 specifies that component buffer 921-3 is processed after both component buffer 921-0 and its child node component buffer 921-2 have been processed. In the example, the document structure 160 is a component hierarchy. However, any format of the document structure 160 can be used that describes the relationships between various page components of the page document 151. For example, the document structure 160 can be a list structure that includes pointers that define the relationships between and among page components.

As shown in FIG. 3B, the server writes (step 420) browser components 150-0, 150-2, 150-3 into the corresponding component buffers 921-0, 921-2, 921-3. A browser component is generated (step 610) from a corresponding page component. Alternatively, instead of using component buffers, browser components can be directly written to an output stream 921-OS or in any other buffer area. For example, in a page, page components can be represented by tags, such as XML tags, e.g., <tagα></tagα>. The server translates the content of these tags into browser-compliant syntax, including a content portion, cα, cβ, cγ, e.g., in JavaScript language or a markup language, such as HTML. The result of the translation is a browser component.

Optionally, the server can follow the hierarchy and copy the content of a component buffer to its parent node in the document structure 160. For example, as shown in FIG. 3B, a browser component 150-0 is generated in the component buffer 921-0. The browser component 150-0 starts with a start tag <α> and a content portion cα. But before closing the browser component 150-0 with an end tag </α>, the server processes a child node, namely the component buffer 921-2. During this processing, the component buffer 921-2 receives a (step 610) browser component 150-2, e.g., <β>cβ</β>. The browser component 150-2 is copied to the parent node of the component buffer 921-2, i.e., the component buffer 921-0. In the component buffer 921-0, the browser component 150-2 is inserted into the browser component 150-0. Then, the browser component 150-0 is closed with the end tag </α>.

The server can copy the content of the component buffer 921-0 to its parent node, i.e., page buffer 921-P. Accordingly, as shown in FIG. 3B, from the component buffer 921-0, the browser component 150-0 is copied to the page buffer 921-P. In page buffer 921-P, the browser component 150-0 can be followed by a next browser component, for example, a browser component 150-3, <γ>cγ</γ>, in component buffer 921-3. The page buffer 921-P and browser components 150-0, 150-2, 150-3 reflect the document structure 160 representing the structure of browser document 150.

Figure 3C:
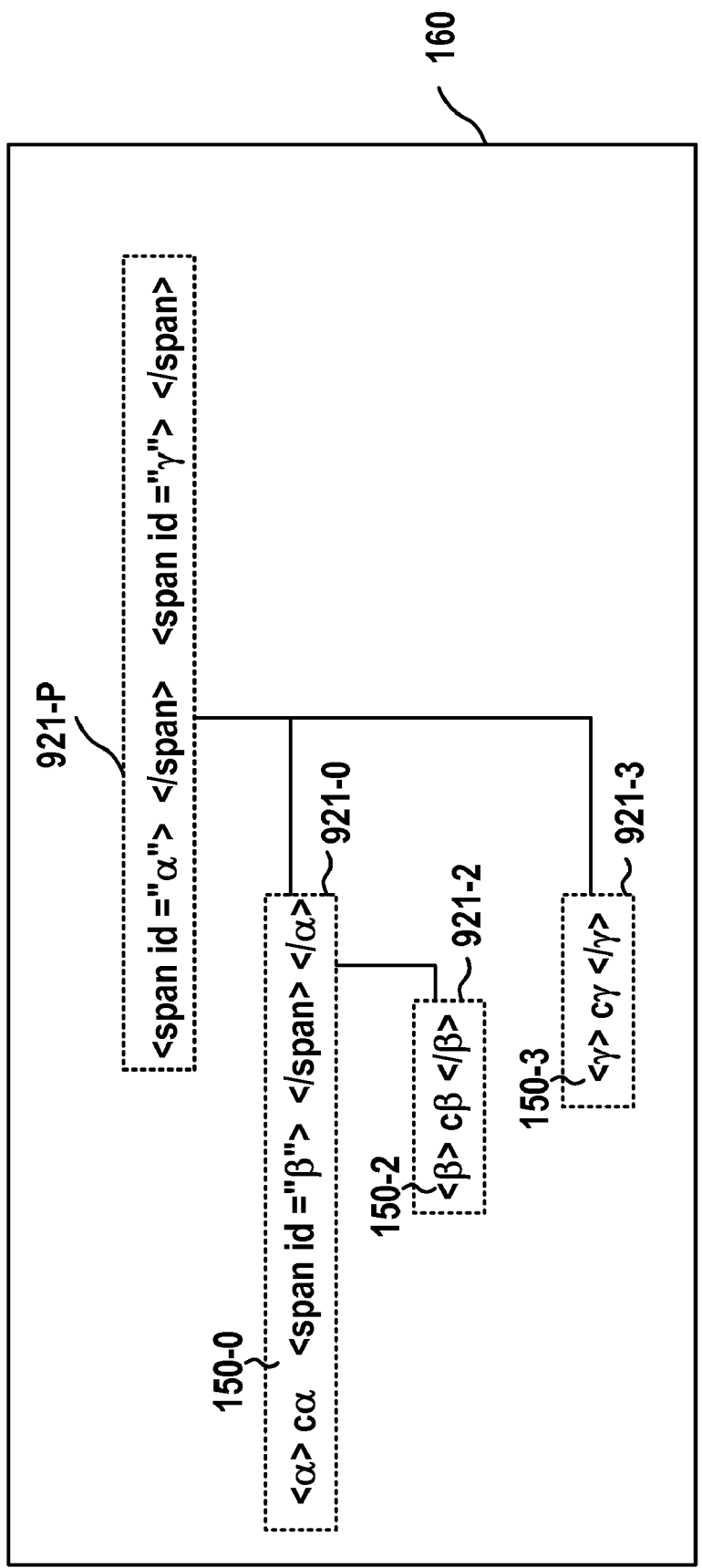

If a browser component of a child node, such as shown in FIG. 3C, is included in the child node's parent node, the server can replace a browser component in the parent node with a representation. Representation here refers to an identifier of the page component that corresponds to the browser component. FIG. 3C illustrates using representation for browser components in the component buffers 921-0, 921-2, 921-3 and page buffer 921-P. In the page buffer 921-P, the browser component 150-0, i.e., <α>cα<β>cβ</β></α>, is replaced with a representation <span id="α"></span>. The <span ... ></span> syntax is an HTML example of a representation. As usual, the id=" ... " parameter refers to the identifiers α, β, γ of the corresponding page components 151-0, 151-2, 151-3, respectively. Alternatively, any other standard representation can be used for referring to a page component's identification. In the example, the browser component 150-3, i.e., <γ>cγ</γ>, is replaced in the page buffer 921-P with a representation <span id="γ"></span>. At the next lower level of the document structure 160, the browser component 150-2, i.e., <β>cβ</β>, is replaced in the component buffer 921-0 with a representation <span id="β"></span>.

Using representations is advantageous in many cases, because a representation requires less memory than the content portion of a corresponding browser component. Furthermore, after replacing browser components with representations as described above, page buffer 921-P and component buffers 921-0, 921-2, 921-3 still include all information about the structure and content of the browser document 150 (see FIG. 2). Representations eliminate redundant information, and preserve necessary structural information.

Figure 3D:
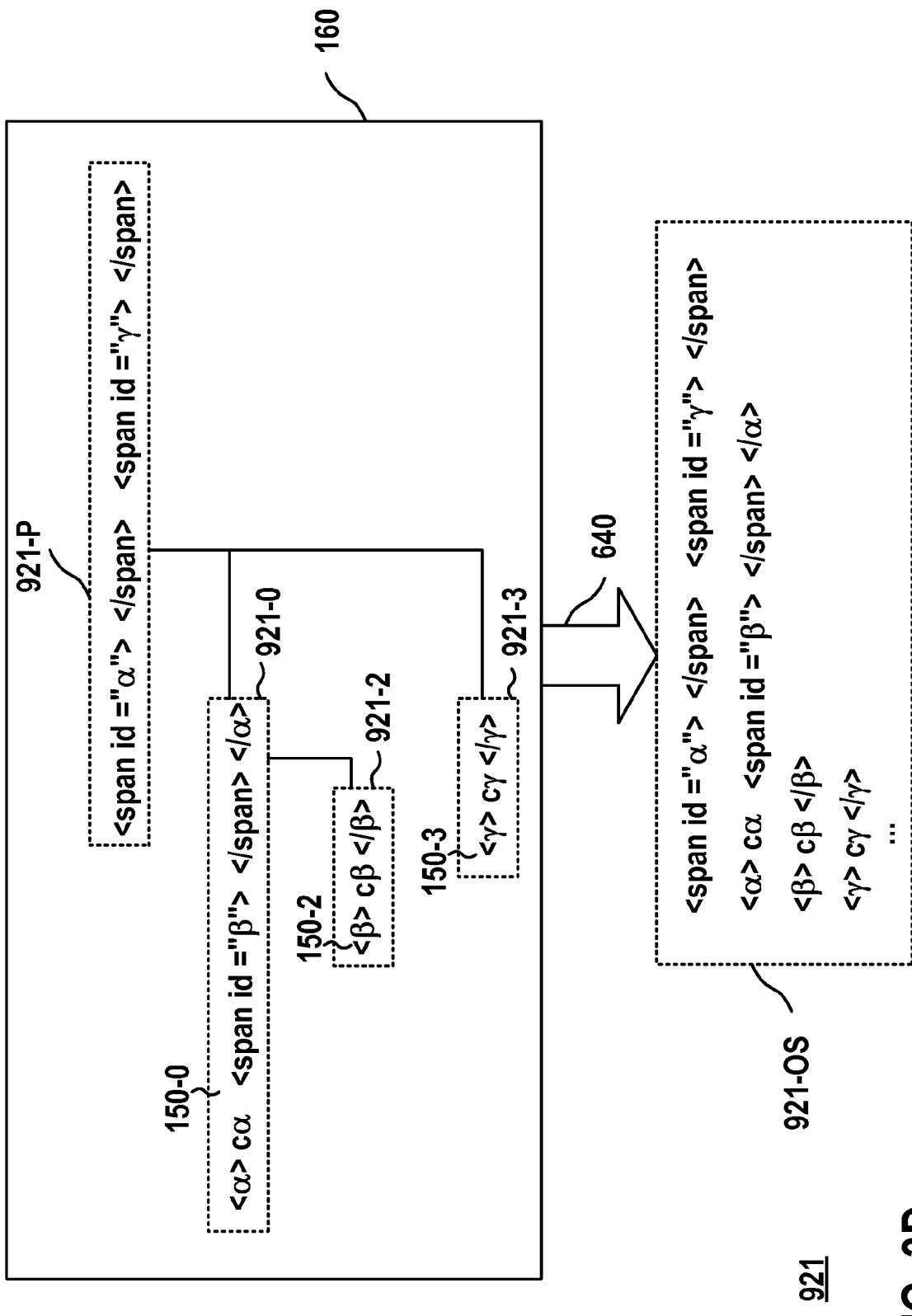

FIG. 3D illustrates generating an output stream 921-OS. In one implementation, the server generates an initial version of a browser document 150 (see, e.g., FIG. 2), and stores the initial version in the server memory. Then, the server sends the initial version to the client that displays it for a user at time T1 (FIG. 2). When sending the initial version to the client, the server can send (step 630) the content of the page buffer 921-P and the content of each component buffer in the document structure 160, i.e., each browser component, to the output stream 921-OS. The output stream 921-OS is a data structure that can be sent to the client. The output stream 921-OS can include HTML code, or JavaScript, or both. Alternatively, the output stream 921-OS can include any other code or scripting language that can be used by a browser on the client. As received by the client for the first time, the output stream 921-OS contains the full browser document 150, including both structure and content. Next, the server can clear the output stream 921-OS.

Later, the server can generate a further version of the browser document 150. Generating the further version can be initiated, for example, by receiving a request 989 as described with reference to FIG. 2. Then, the server can compare the further version with the initial version to identify deltas, i.e., differences, between the two versions. Referring back to the example implementation shown in FIG. 1, when comparing the initial version with the further version, the deltas include the contact name "SMITH" and the phone number value "98765-4321". For convenience, in the following description of FIG. 3E, only the phone number value is considered.

Figure 3E:
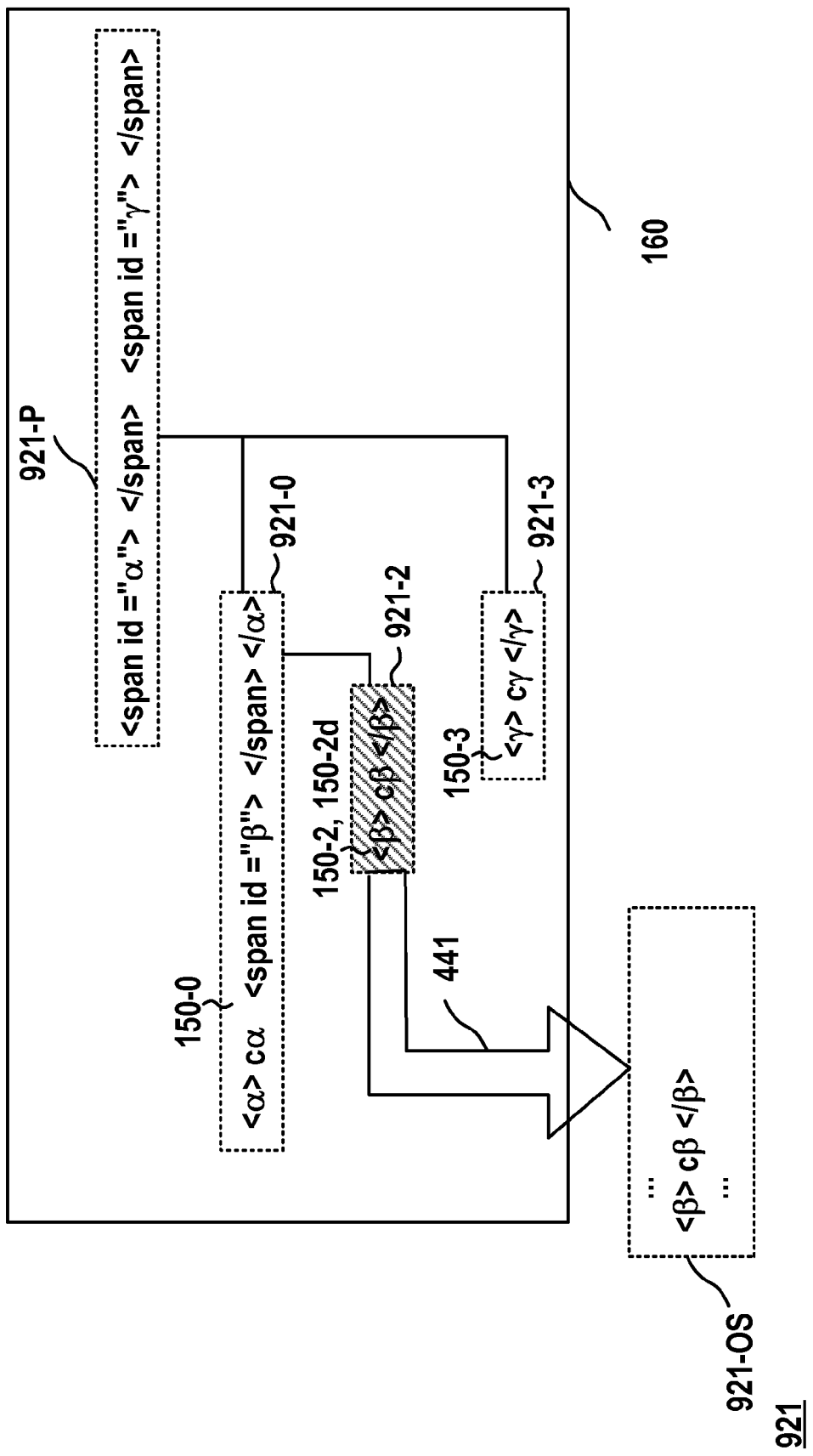

As shown in FIG. 3E, the server can generate (step 441) an output stream 921-OS. After comparing the initial version with the further version, the server identifies (step 430; FIG. 2) the browser delta 150-2d in the component buffer 921-2. The server writes the browser delta 150-2d to the output stream 921-OS and sends (440) it to the client. The server replaces the initial version with the further version, and the method described with reference to FIGS. 2-3C and 3E can be repeated. Because the client knows the structure and static content-portions of the browser document 150 from the initial version, the client can update the browser document 150 by using the browser delta 150-2d.

The following tables show examples of data structures for coding the example implementation shown in FIG. 1. For convenience, the examples focus on the phone component 955-2. In the coding sections, ellipses denote omitted coding blocks.

Table 1 illustrates a portion of a tag source of GUI 955, i.e., <htmlb:page>. Frame component 955-0, i.e., <htmlb:form>, includes the phone component 955-2 as <htmlb:inputField id="phone" ... >.

TABLE 1

```
<%@page language="Java"%>
<%@taglib uri="http://..." prefix="htmlb"%>
...
  <htmlb:page>
    <htmlb:form>
      ...
      <htmlb:inputField id    = "phone"
             value  = "<%=phone%>"
           ... /> <BR>
      ...
    </htmlb:form>
  </htmlb:page>
...
```

To provide this tag source to the browser used by the client, the server generates an initial version of a browser document 150 as illustrated by such as the example shown in Table 2. Table 2 shows a content that is included in the output stream 921-OS in FIG. 3D.

TABLE 2

```
<html>
<head>
...
</head>
<body>
<span id="htmlb_form_1"></span>
...
</body>
</html>
<script language="JavaScript">
...
    dom_of_visible_item.doc("htmlb_form_1").outerHTML = '<form id=\"htmlb_form_1\" name=\"htmlb_form_1\" ...>
    <span id=\"...\"></span> <BR> <span id=\"phone\"></span> ...
    </form>';
...
    dom_of_visible_item.doc("phone").outerHTML = '<input type=\"text\"...name=\"phone\" id=\"phone\" value=\"\">';
...
</script>
```

In Table 2, the portion from <html> to </html> illustrates an HTML example of content of page buffer 921-P for the initial version. Referring to FIG. 3D, id="htmlb_form_1" corresponds to id="α".

In Table 2, a JavaScript portion starts at <script language="JavaScript"> and ends at </script>. In the JavaScript portion, a JavaScript function dom_of_visible_item.doc("htmlb_form_1").outerHTML is a JavaScript implementation of the browser components 150-0. Similarly, dom_of_visible_item.doc("phone").outerHTML is a JavaScript implementation of browser components 150-2. In the initial version, the phone number value is empty ( ... id=\"phone\" value=\"\" ... ). When the server sends the initial version to the client, Table 2 is included in the output stream 921-OS (FIG. 3D).

TABLE 3

```
<script language="JavaScript">
...
    dom_of_visible_item.doc("phone").outerHTML = '<input type=\"text\" ... name=\"phone\" id=\"phone\" value=\"98765-4321\">';
...
</script>
```

Table 3 is an example JavaScript implementation of browser delta 150-2d stored in component buffer 921-2 (see, e.g., FIG. 3D). The browser delta 150-2d is written to output stream 921-OS. In the example, the JavaScript function dom_of_visible_item.doc("phone").outerHTML includes the retrieved phone number value (value=\"98765-4321\") of browser component 150-2 (id=\"phone\"). Furthermore, the function dom_of_visible_item.doc("phone").outerHTML indicates to the client that, in the document object model corresponding to the browser document 150, the item ("phone") has to be replaced with the output of the function.

Figure 4A:
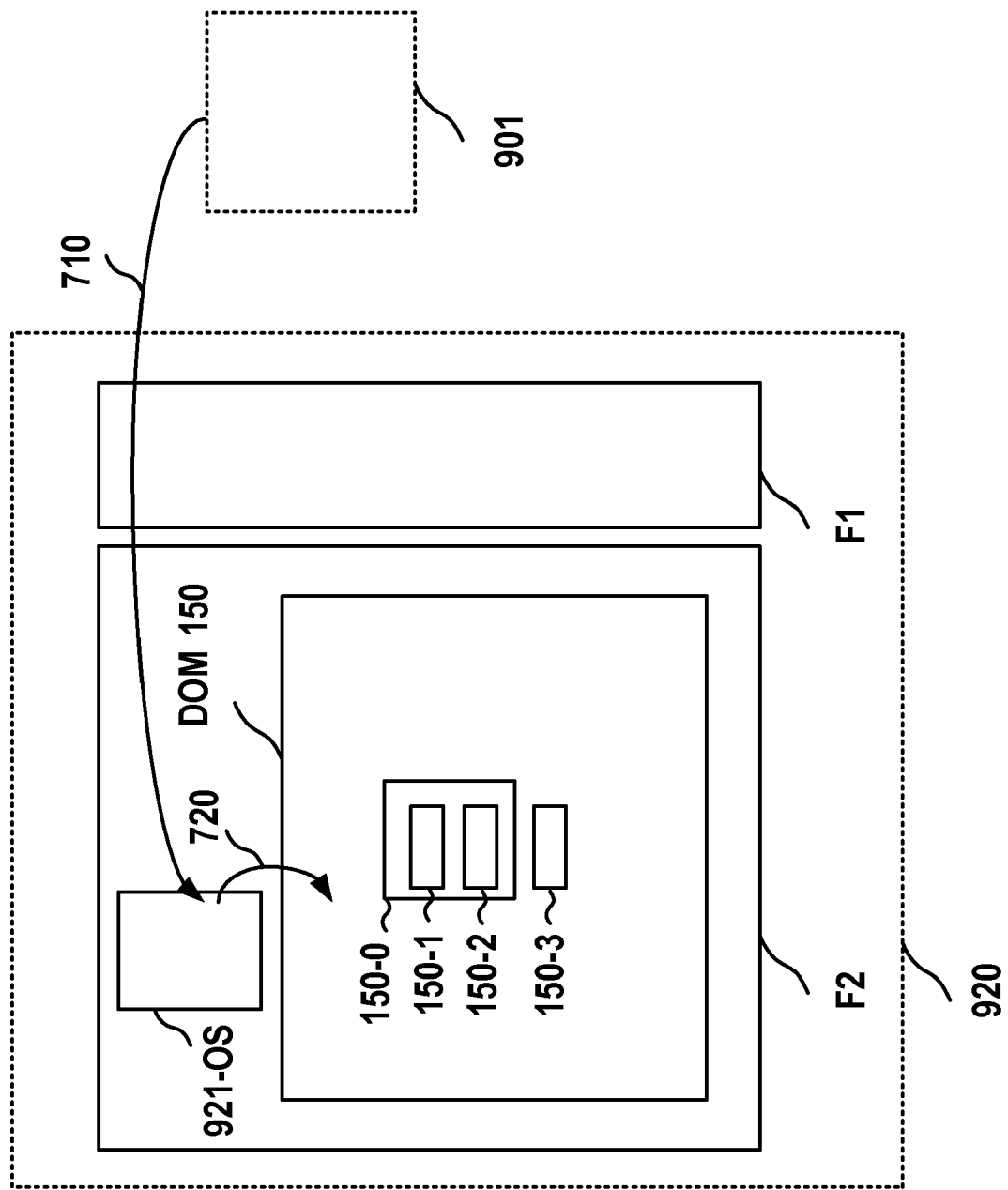
FIGS. 4A-4B are schematic diagrams illustrating a client processing an output stream.
Figure 4B:
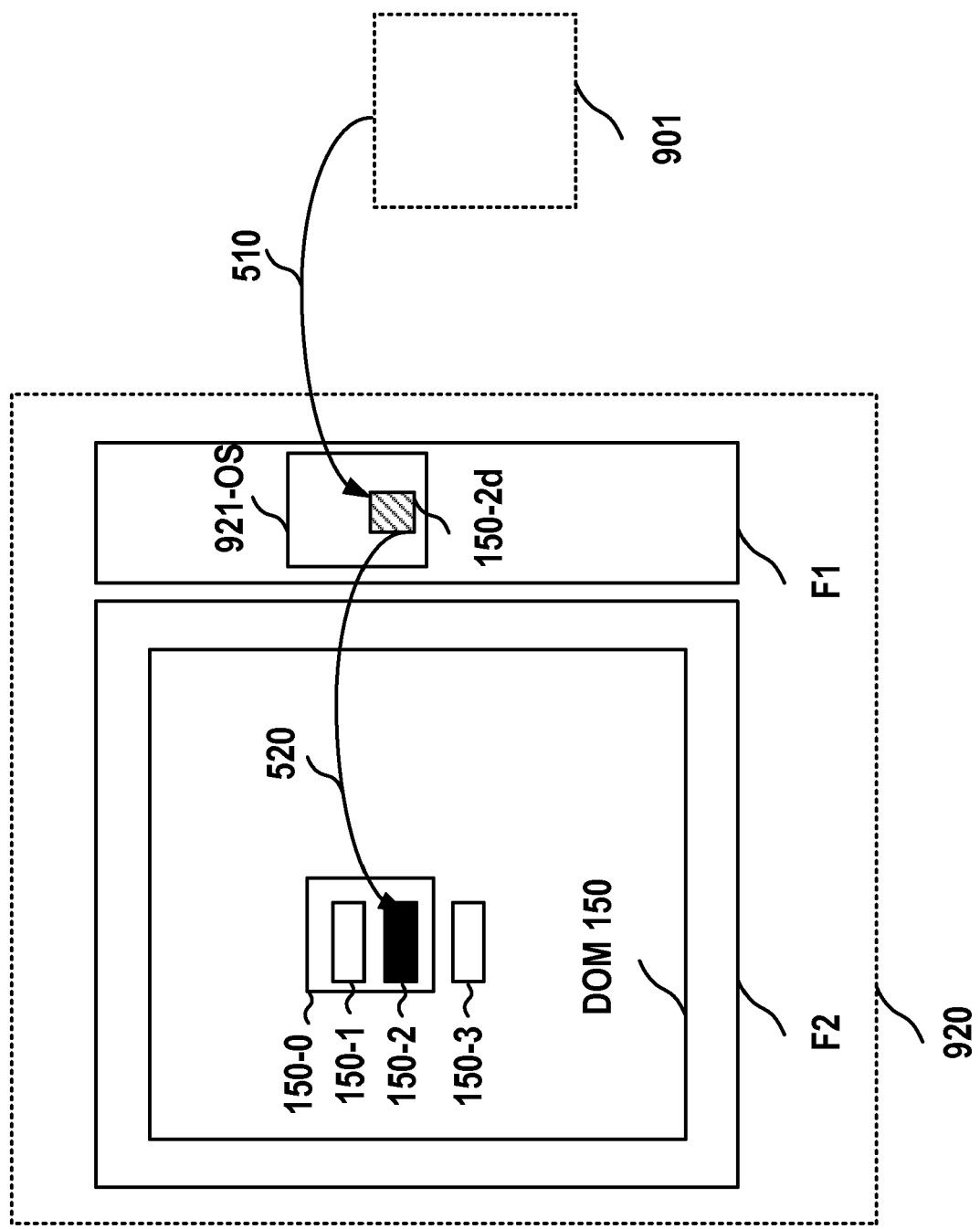

As shown in FIGS. 4A and 4B, a client can process an output stream 921-OS. As shown in FIG. 4A, the client initially receives the output stream 921-OS from the server. In one implementation, memory 920 of the client stores a first frame F1 and a second frame F2. The output stream 921-OS can be received (step 710) by the first frame F1 or the second frame F2. The client builds (step 720) a Document Object Model (DOM 150) of a browser document 150 from the output stream 921-OS. For example, the browser document 150 includes browser components 150-0, 150-2, and 150-3.

As shown in FIG. 4B, a client can update browser document 150 with browser delta 150-2d. For example, the client sends (step 220; FIG. 2) a request 989 to the server. In the request 989, the client asks the server to send any server response, such as output stream 921-OS, to the first frame F1. When the client receives (step 510) the browser delta 150-2d from the server, e.g., as part of the output stream 921-OS, the memory 920 stores the browser delta 150-2d in the first frame F1. The client does not display the first frame F1 on an output device. For example, the width of the first frame F1 can be limited to a single pixel.

The client then updates (step 520) the browser document 150 stored in the second frame F2. The second frame F2 is already displayed on an output device. To update the browser document 150, the client can use the browser document structure information of page buffer 921-P from the initial version. Using this information, the client can replace modified parts of browser component 150-2 with the corresponding browser delta 150-2d (illustrated by dark fill color in FIG. 4) in the DOM 150 of the browser document 150. Equivalent techniques can be used as well to inject the browser delta 150-2d into the browser document 150. With the above implementations, the client may update (step 520) the browser document 150 without causing screen flicker of form 955 (FIG. 1) for the user.

Figure 5:
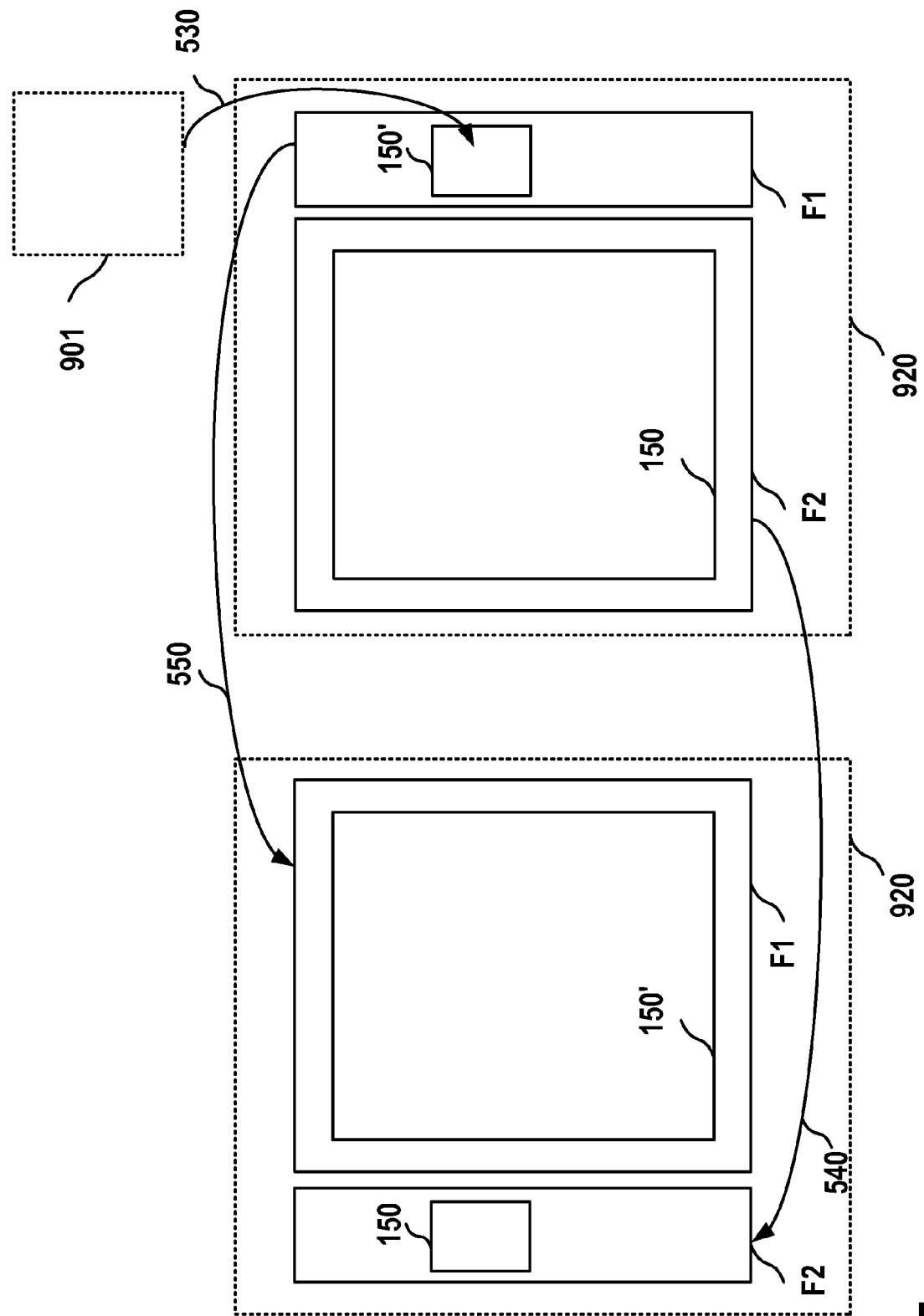
FIG. 5 is a schematic diagram showing a client receiving a new browser document in one implementation of the invention.

As shown in FIG. 5, the client can swap the roles of the first frame F1 and the second frame F2. Swapping frames can occur when the client receives a new browser document 150', instead of a browser delta, from the server. The new browser document 150' is received in the first frame F1 of the client. Then, the client recognizes the new browser document 150'. Next, substantially simultaneously, the client reduces (step 540) the size of the second frame F2 and expands (step 550) the size of first frame F1. After the reduction, the second frame F2 preferably becomes invisible for the user. After the expansion, the first frame F1 can take the previous size of the second frame F2. Alternatively, the first frame F1 can take another size that is appropriate for the new browser document 150'. Alternatively, the expansion can follow the reduction. Swapping frames is typically faster than updating the second frame F2 with the new browser document 150' received in the first frame F1. Swapping frames can result in less screen flicker and waiting time for the user. After swapping frames, the second frame F2 takes the role of a receiver frame for browser deltas.

FIGS. 6A and 6B show a server method 400 and a client method 500, respectively, for delta handling. In FIGS. 6A and 6B, mandatory method steps are illustrated by solid lines and frames, while optional method steps are illustrated by dashed lines and frames.

FIG. 6A shows the server method 400 for delta handling of a page document 151 stored in a server memory. The page document 151 includes page components 151-0, 151-1, 151-2, and 151-3. The server method 400 includes an allocating step (410) and a writing step (420). In the allocating step, a component buffer, e.g., 921-0, 921-1, 921-2, or 921-3, is allocated to each page component, 151-0 151-1, 151-2, 151-3. In the writing step, a corresponding browser component, e.g., 150-0, 150-1, 150-2, or 150-3, is written into each component buffer, i.e., 921-0, 921-1, 921-2, or 921-3.

Optionally, the server method 400 is queried if it is executed the first time for the page document 151 (decision 425). If not (NO branch of decision 425), further steps include an identifying step (430) and a sending step (440). In the identifying step, the server identifies a browser delta 150-2d and a corresponding component buffer 921-2 that stores the browser delta. In the sending step, the browser delta 150-2d is sent from the server to the client. The browser delta 150-2d can be in a browser-compliant language selected from the group of HTML, XML, XHTML, WML, JavaScript and Visual Basic Script.

If the server method 400 is executed the first time (YES branch of decision 425) for the page document 151, further steps include a building step (421), a replacing step (422), and a sending step (423).

In the building step (421), the server builds a document structure 160. The server allocates page buffer 921-P to page document 151. The page buffer 921-P is the root node of the document structure 160 and is a parent node of at least one component buffer, e.g., 921-0 or 921-3. Each component buffer, e.g., 921-0, can be a parent node of further component buffers, e.g., 921-1 or 921-2.

In the replacing step (422), the server replaces browser components with representations. For example, child nodes 921-0, 921-2, 921-3 include browser components 150-0, 150-2, 150-3, respectively. These child nodes have parent nodes, e.g., 921-P or 921-0, in the document structure 160. In the parent nodes, the server can replace the browser components 150-0, 150-2, or 150-3 with a representation, e.g., <span ...> </span>.

In the sending step (423), the server sends the page buffer 921-P and each component buffer, i.e., 921-0, 921-1, 921-2, and 921-3, of the document structure 160 to the client.

In a page document 151, a page component, e.g., 151-0, 151-1, 151-2, or 151-3, can be represented by a tag within the page document 151. Furthermore, each component buffer, e.g., 921-0, 921-1, 921-2, and 921-3, can be stored in a memory stack of the server memory. Optionally, component buffers can be stored in another memory of a computer system.

FIG. 6B shows the client method 500 for delta-handling a browser document 150 stored on a client. The browser document 150 corresponds to the page document 151 stored on the server. The browser-document 150 includes multiple browser components, e.g., 150-0, 150-1, 150-2, and 150-3. A browser component, i.e., 150-0, 150-1, 150-2, or 150-3, refers to a corresponding page component, 151-0, 151-1, 151-2, or 151-3, respectively, of the page document 151. The client method 500 includes a receiving step (510) and an updating step (520).

In the receiving step (510), the client receives a browser delta 150-2d from the server. The browser delta 150-2d refers to a specific browser component 150-2. The server identifies the browser delta 150-2d through a component buffer 921-2 allocated to the corresponding page component 151-2.

In the updating step (520), the client updates the browser document 150 with the browser delta 151-2d. To update the browser document 150, the client can inject the browser delta 151-2d into a document object model of the browser document 150. The document object model is stored in the client memory.

In an implementation using multiple frames as described earlier, the client receives the browser delta 151-2d in a first frame F1 of the client memory. The browser document 150 is updated (step 520) with the browser delta 151-2d in a second frame F2 of the client memory. The first frame F1 can be invisible.

In an alternative implementation, the client method 500 includes the following steps: receiving (step 530) a new browser document 150' in the first frame F1; reducing (step 540) the size of the second frame F2; and expanding (step 550) the size of the first frame F1. After reduction, the second frame F2 can be invisible.

FIGS. 7A and 7B show a server method 600 and a client method 700, respectively, for enabling delta handling. A server can execute a server computer program implementing the server method 600, and a client can execute a computer program implementing the client method 700. These computer programs can be stored on any computer readable medium or carried by a signal on a network.

FIG. 7A shows the server method 600 for providing an output stream 921-OS for delta handling in server pages on the server. The server stores a page document 151 that includes multiple page components, e.g., 151-0, 151-2, and 151-3. The server method 600 includes a generating step (610) and a building step (620). The server generates (step 610) for each page component, i.e., 151-0, 151-2, and 151-3, a corresponding browser component, e.g., 150-0, 150-2, and 150-3, respectively. Then, the server builds (step 620) a document structure 160 of a browser document 150. The browser document 150 corresponds to the page document 151. The document structure 160 includes a page buffer 921-P and browser components 150-0, 150-2, and 150-3. The page buffer 921-P and the browser components 150-0, 150-2, and 150-3 have relationships that reflect the structure of the browser document 150.

Optionally, the server method 600 is queried if it is executed the first time (decision 625). If yes (YES branch of decision 625), the server can send (step 630) the document structure 160 to the output stream 921-OS. If the server method 600 is executed at least a second time for page document 151 (NO branch of decision 625), the server can identify (step 640) a browser delta 150-2d in the document structure 160, and send (step 650) the browser delta 150-2d to the output stream 921-OS. The output stream 921-OS does not have redundant information about the browser components, but still has all the information about the structure and content of the browser document 150.

FIG. 7B shows the client method 700 for delta-handling an output stream 921-OS from a server. The client method 700 includes a receiving step (710) and a building step (720). First, the client receives (step 710) the output stream 921-OS from the server. The output stream 921-OS includes a document structure 160 of a browser document 150 corresponding to a page document 151 on the server. The document structure 160 includes a page buffer 921-P and multiple browser components, e.g., 150-0, 150-2, and 150-3. The page buffer 921-P and the browser components 150-0, 150-2, 150-3 have relationships that reflect the structure of the browser document 150.

The client (step 720) a DOM 150 of the browser document 150 from the output stream 921-OS. The browser document 150 includes the browser components 150-0, 150-2, and 150-3, of the document structure 160. To build the document object model DOM 150, the client parses the browser document 150 included in the output stream 921-OS with a browser, and loads the parsed result into the client memory.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, steps of the invention can be performed in a different order and still achieve desirable results.

What is claimed is:

1. A system for processing a page document that comprises a plurality of page components, the system, comprising:
    a processor; and
    a memory for storing instructions, which when executed by the processor, causes the processor to perform operations comprising:
        generating a browser document from the page document, wherein generating the browser document from the page document includes:
            generating for each page component of the page document a corresponding browser component, wherein:
                each browser component corresponds to a unique page component of the plurality of page components, and
                each browser component is in a browser compliant syntax;
            building a document structure of the browser document from the page document, wherein:
                the browser document corresponds to the page document,
                the document structure comprises a page buffer content and the browser components that have been generated,
                the page buffer content is in the browser compliant syntax,
                the page buffer content corresponds to content of the page document, and
                the page buffer content and the browser components have relationships that reflect the document structure of the browser document;
        sending the browser document to a client;
        receiving a user input from the client, the user input provided as an input to a browser component of the browser document;
        processing the user input to generate an application delta;
        identifying at least one browser delta in the document structure including:
            retrieving a first component of the browser document in the browser compliant syntax, the first component including the application delta,
            retrieving, from a page buffer, a second component of the browser document in the browser compliant syntax, the second component corresponding to a previous first component prior to inclusion of the application delta, and
            comparing the first component to the second component to identify at least one browser delta in the document, the at least one browser delta being in the browser compliant syntax;
        sending the at least one browser delta to an output stream; and
        sending the output stream to an invisible first frame in response to a client request for a response directed to the first invisible frame, wherein the client injects the at least one browser delta into a document object model of the browser document displayed in a second visible frame.

2. The system of claim 1, wherein the page document is a JSP, BSP, ADP, or ASP page.

3. The system of claim 1, wherein each page component is represented by a tag within the page document.

4. The system of claim 1, wherein:
    the page buffer content includes a copy of each of the plurality of browser components.

5. The system of claim 1, wherein:
    one or more of the plurality of browser components corresponds to one or more respective child nodes in the document structure; and
    the page buffer content includes a representation of each of the one or more of the plurality of browser components that corresponds to the one or more respective child nodes.

6. A system for using an output stream received from a server, the system, comprising:
    a processor; and
    a memory for storing instructions, which when executed by the processor, causes the processor to perform operations comprising:

receiving the output stream from the server, wherein:
- the output stream comprises a document structure of a browser document,
- the browser document corresponds to a page document on the server and the document structure of the browser document is generated from the page document,
- the document structure comprises a page buffer content and a plurality of browser components, wherein:
  - each browser component corresponds to a unique page component of a plurality of page components,
  - each browser component is in a browser compliant syntax,
  - the page buffer content is in a browser compliant syntax,
  - the page buffer content corresponds to content of the page document, and
  - the page buffer content and the browser components have relationships that reflect the document structure of the browser document;

building from the output stream a document object model of the browser document;

requesting a server response from the server, the server response including at least one browser delta and being directed to a first invisible frame, where the at least one browser delta is identified at the server by:
- receiving a user input from the client, the user input provided as an input to a browser component of the browser document;
- processing the user input to generate an application delta;
- retrieving a first component of the browser document in the browser compliant syntax, the first component including the application delta,
- retrieving, from a page buffer, a second component of the browser document in the browser compliant syntax, the second component corresponding to a previous first component prior to inclusion of the application delta, and
- comparing the first component to the second component to identify the at least one browser delta in the document, the at least one browser delta being in the browser compliant syntax;

receiving the at least one browser delta from the server in the first invisible frame; and updating the document object model by injecting the at least one browser delta into the document object model of the browser document displayed in a second visible frame.

7. The system of claim 6, wherein:
the page buffer content includes a copy of each of the plurality of browser components.

8. The system of claim 6, wherein:
one or more of the plurality of browser components corresponds to one or more respective child nodes in the document structure; and the page buffer content includes a representation of each of the one or more of the plurality of browser components that corresponds to the one or more respective child nodes.

9. A system for creating an output on a server for a client, the system, comprising:
- a processor; and
- a memory for storing instructions, which when executed by the processor, causes the processor to perform operations comprising:
  - creating a first data structure as a first output stream on the server for the client, the first data structure comprising a page buffer content and a plurality of browser components, wherein:
    - the page buffer content is the root node of a document structure,
    - each browser component is in a browser-compliant syntax and corresponds to a unique page component of a plurality of page components,
    - the page buffer content is in the browser-compliant syntax,
    - the page buffer content corresponds to content of a page document, and
    - a page buffer and the plurality of browser components have relationships that reflect the document structure of a browser document represented by the first data structure, the document structure being generated from the page document on the server; and
  - creating a second data structure as a second output stream on the server for the client, the second data structure comprising a browser delta, wherein the browser delta is identified by:
    - receiving a user input from the client, the user input provided as an input to a browser component of the browser document;
    - processing the user input to generate an application delta;
    - retrieving a first component of the browser document in the browser compliant syntax, the first component including the application delta,
    - retrieving a second component of the browser document in the browser compliant syntax, the second component corresponding to a previous first component prior to inclusion of the application delta, and
    - comparing the first component to the second component to identify at least one browser delta in the document, the at least one browser delta being in the browser compliant syntax.

10. The system of claim 9, wherein:
the page buffer content includes a copy of each of the plurality of browser components.

11. The system of claim 9, wherein:
one or more of the plurality of browser components corresponds to one or more respective child nodes in the document structure; and
the page buffer content includes a representation of each of the one or more of the plurality of browser components that corresponds to the one or more respective child nodes.

* * * * *